United States Patent [19]
Kudler

[11] Patent Number: 5,100,173
[45] Date of Patent: Mar. 31, 1992

[54] LAP BAR FOR BUMPER CARS

[76] Inventor: Jeffrey P. Kudler, P.O. Box 128, New Waterford, Ohio 44445

[21] Appl. No.: 631,246

[22] Filed: Dec. 20, 1990

[51] Int. Cl.⁵ .............................................. B60R 21/02
[52] U.S. Cl. .................................... 280/748; 180/271; 297/487
[58] Field of Search .................... 280/748, 751, 753; 180/271; 297/487, 488, 464; 296/56, 76; 267/120

[56] References Cited

U.S. PATENT DOCUMENTS

| | | | |
|---|---|---|---|
| 3,393,010 | 7/1968 | Steinberg | 280/753 |
| 3,486,767 | 12/1969 | Lujan . | |
| 3,583,761 | 6/1971 | Hume | 297/488 |
| 3,888,540 | 6/1975 | Protze et al. | 280/748 |
| 3,963,227 | 6/1976 | Mölders | 296/56 |
| 4,005,877 | 2/1977 | Humphries | 280/748 |
| 4,156,523 | 5/1979 | Bauer | 267/120 |
| 4,415,194 | 11/1983 | Bauer | 296/56 |
| 4,796,913 | 1/1989 | Amabile et al. | 280/751 |

Primary Examiner—Charles A. Marmor
Assistant Examiner—Paul Dickson
Attorney, Agent, or Firm—Harpman & Harpman

[57] ABSTRACT

A restraining device for a U-shaped lap bar on a bumper car, the ends of which are pivotally mounted to the bumper car, is adapted to rest on the laps of the passengers and is movable to an over-center elevated position. A pneumatic piston and cylinder assembly is pivoted at one of its ends to the U-shaped lap bar and pivoted at its other end to a support bracket at a point thereon spaced with respect to a center line of the lap bar to which it is attached so that movement of the lap bar moves the piston to compress gas in the cylinder whereby pressure in the pneumatic cylinder holds the lap bar in restraint in lower position and in elevated position.

4 Claims, 2 Drawing Sheets

LAP BAR FOR BUMPER CARS

BACKGROUND OF THE INVENTION

1. Technical Field

This invention relates to bumper cars such as used for amusement purposes and more particularly to improved restraint means for such cars.

2. Description of the Prior Art

The prior art devices comprise loop-type seat belts, adjustable buckle-type seat belts, and rope or shoulder belts which require operation by the rider and adjustment and/or fastening or other engaging means which are different for an operator to visually determine.

U.S. Pat. No. 3,393,010 discloses a lap bar which is pivoted in swingable position and provided with a hydraulic locking device including a piston and cylinder with valves to control the actuation thereof. The valves are controlled by a manually operable button which is theoretically actuated by the rider.

U.S. Pat. No. 3,486,767 discloses a hydraulic actuated cushioning member mounted in front of a seat on a motorcycle. The cushioning member comprises a pad on the end of an arm which is pivoted to the motorcycle frame and a shock absorbing device which is a spring or fluid urging a piston and cylinder. Forward motion is restrained by the need of compressing fluid in the cylinder or comprising said spring said.

U.S. Pat. No. 4,796,913 discloses a restraining device for use with bench seats, such as used in school buses, wherein a restraining bar is attached to a forward seat to restrain passengers in a rearward seat. A hinge plate mounted on the forward seat includes a profiled cam and a generally arcuate rear face having an upper limit position, a lower limit position and a locking lower position. The restraining bar has an arm at each end which extends to the plate on the forward seat and the arms have a slot sized to receive a pivot pin on the hinge plate. Movement of the bar toward the forward seat moves the arms forward and engages a locking pin in a recess holding the bar in horizontal position on the laps of passengers.

None of the prior art disclosures disclose or otherwise anticipate the simple pneumatic cylinder lap bar restraining means of the present invention which results from the horizontally and vertically spaced pivotal mountings of the arms of the lap bar and the adjacent end of the pneumatic piston and cylinder assembly.

SUMMARY OF THE INVENTION

A lap bar for a bumper car used for amusement purposes has a pair of mounting brackets secured to the frame of the bumper car forwardly of the rider's set and adjacent the sides of the bumper car. A lap of a widened U-shape configuration has a cushion plate of channel-shape secured to the transverse portion of the bar between its right angular ends which in turn are provided with apertured fittings for engagement with pivots on the support brackets. A pneumatic piston and cylinder is positioned along an outer side of one of the right angular arms of the lap bar with one of its ends pivoted thereto and its other end pivoted to one of the support brackets at a point spaced horizontally and vertically with respect to the pivot engaging the arm of the lap bar. The pneumatic piston and cylinder assembly comprises a piston and rod in a cylinder which is loaded with an inert gas and hermetically sealed. It acts as a compression spring by the internal gas pressure working on the rod area only. Its location relative to the pivoting position of the lap bar causes the piston to move against fluid pressure in the cylinder when the same is moved toward and away from a horizontal position and toward and away from a second upright or substantially vertical position and thereby insures retention of the lap bar in desired position either n the rider's lap or in elevated out of the way position.

DESCRIPTION OF THE PREFERRED EMBODIMENT

Figure 1:
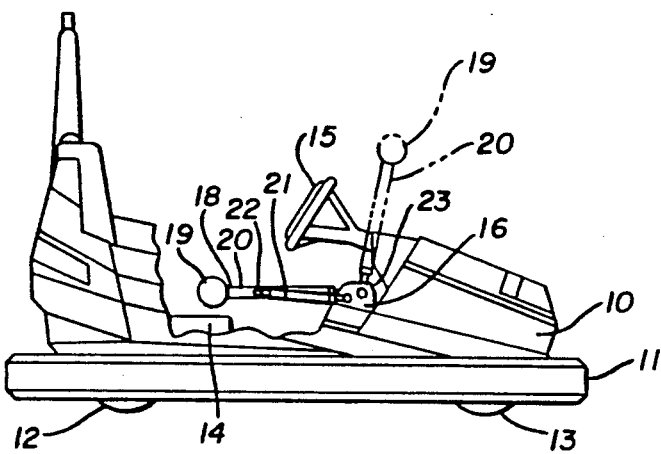
FIG. 1 is a side elevation of a bumper car with parts broken away and illustrating in solid lines the lap bar in restraining position with respect to a rider's position and in broken lines in elevated position.

By referring to FIG. 1 of the drawings, a bumper car may be seen including a body 10 having an outwardly extending lower body portion 11 comprising a bumper which extends outwardly of the car completely therearound. Support wheels 12 and 13 are provided for supporting the bumper car and for driving it and steering it as known in the art.

In FIG. 1 of the drawing, a portion of the sides of the car have been broken away to illustrate a seat 14 which is spaced rearwardly with respect to a steering wheel 15. A pair of support brackets 16 and 17, respectively, are secured to the sides of the car and/or its frame, not shown, and extend upwardly from the sides at points forwardly of the steering wheel 15. A lap bar 18 is shown in solid and broken lines in FIG. 1 of the drawings with an enlarged synthetic resin foam cushion 19 on its transverse section.

Figure 4:
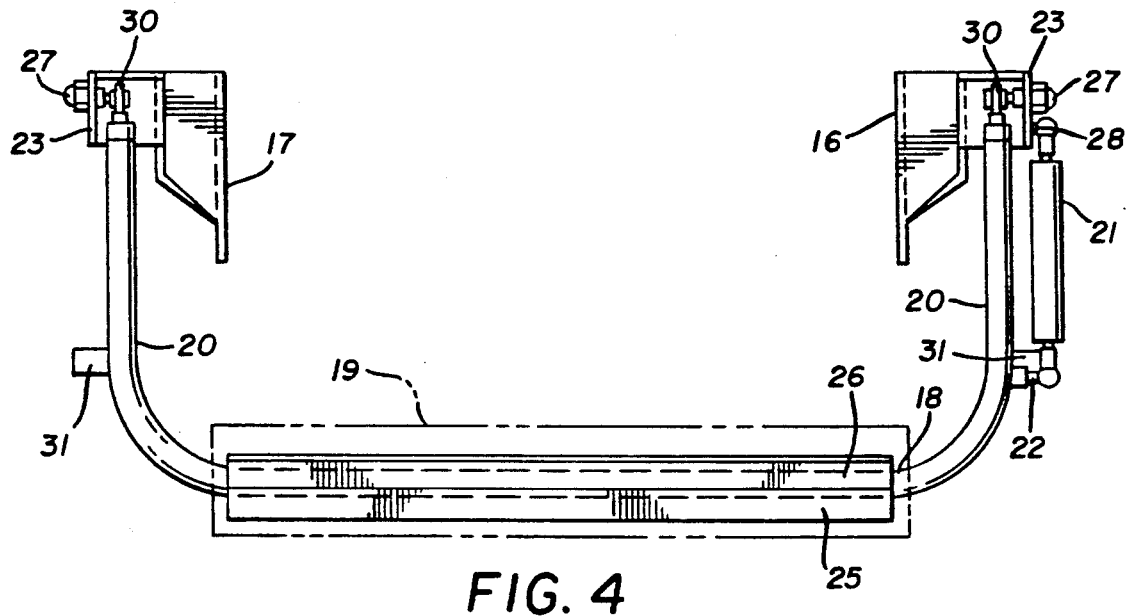
FIG. 4 is a top plan view of the lap bar and its supporting brackets.
Figure 5:
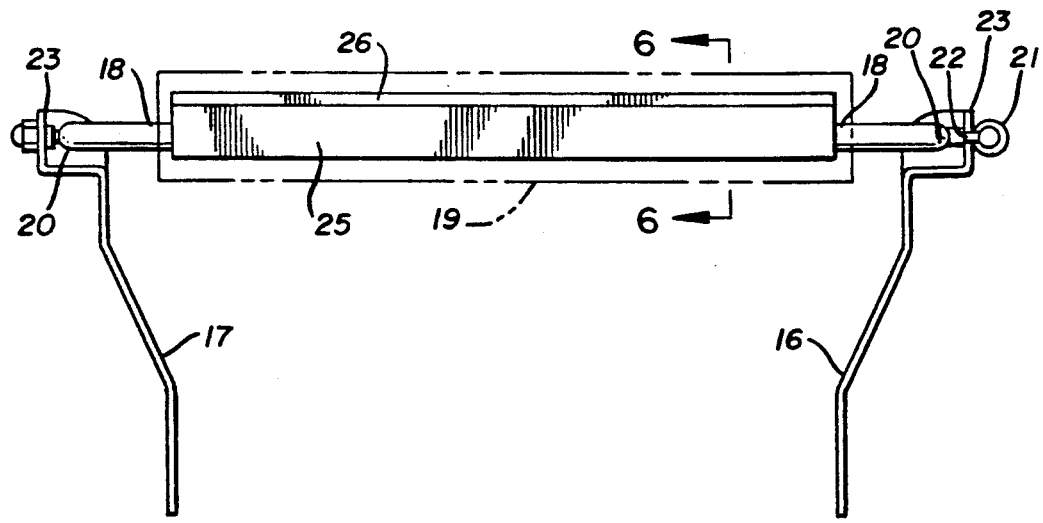
FIG. 5 is a plan view of the support bar and its supporting brackets.

As illustrated in FIG. 4 of the drawings, the lap bar 18 may be seen to comprise a heavy duty stainless steel tube having a transverse section and right angular arms 20.

Still referring to FIGS. 1 and 4 of the drawings, it will be seen that a pneumatic piston and cylinder assembly 21 is pivoted at its piston end 29 to a second pivot member 22 on one of the arms 20 near its transverse section and pivoted at its opposite cylinder end to a second pivot member 28 on an upstanding outwardly offset flange 23 of the support bracket 16. The piston and cylinder assembly 21 is a restraining device.

In FIG. 1 of the drawings, it will be seen that broken lines illustrate a substantially vertical position of the lap bar 18.

Figure 2:
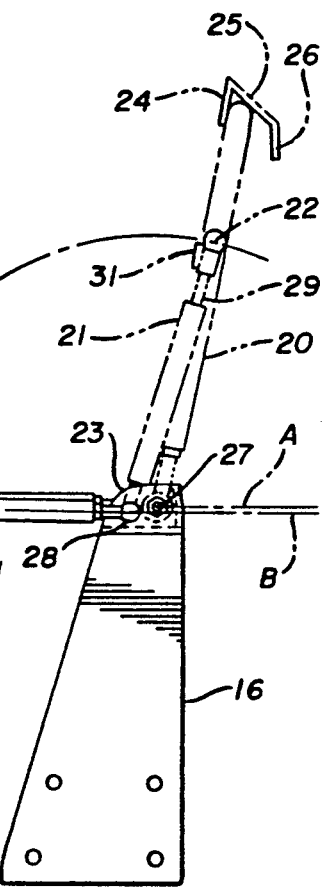
FIG. 2 is an enlarged detail of one of the mounting brackets holding the lap bar and solid lines illustrate the lap bar in lowered position. Broken center lines on the solid lines indicate the vertically offset and horizontally spaced relation of the pivots mounting the pneumatic piston and cylinder assembly and the arm of the lap bar on the support bracket.

By referring now to FIG. 2 of the drawings, it will be seen that the transverse section of the lap bar 18 is provided with a longitudinally extending cushion plate 24, which is a modified channel-shape in cross section having an upwardly angled portion 25 and an outwardly and slightly upwardly angled portion 26.

Figure 6:
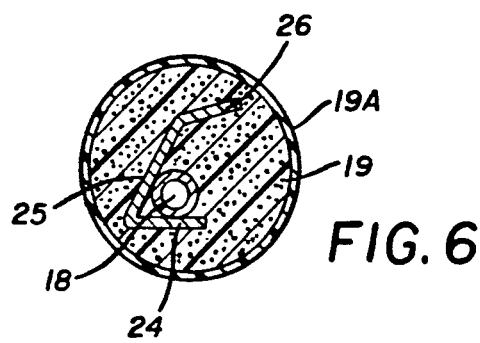
FIG. 6 is a cross sectional view of circular foamed resin cushion on the lap bar.

By referring to FIG. 6 of the drawings, it will be seen that this cushion plate 24 and the transverse portion of the U-shaped frame 18 are enclosed by a foamed synthetic resin body 19 having a smooth unbroken skin 19A.

Figure 3:
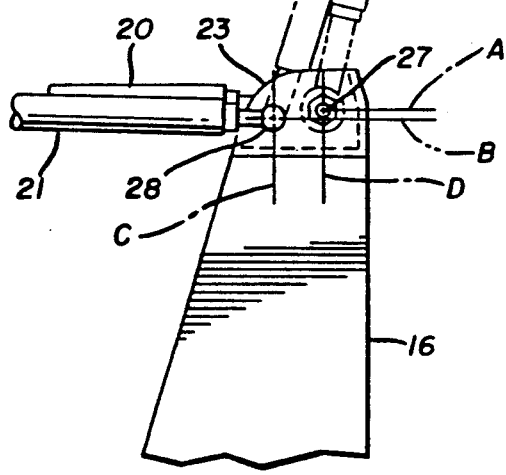
FIG. 3 is a still further enlarged side elevation with parts broken away and showing in solid lines one of the arms of the lap bar and the pneumatic piston and cylinder assembly and in broken lines the same part in vertical position and emphasizing the vertically and horizontally spaced location of the respective pivots of the members to the support bracket.

In FIGS. 1, 2 and 3 of the drawings, the ends of the arms 20 of the widened U-shaped frame 18 are pivotally engaged first pivot pins 27 positioned in the upturn flanges 23 of the support brackets 16 and 17 respectively.

In FIGS. 1, 2 and 3 of the drawings, it will be seen that the cylinder end of the pneumatic piston and cylinder assembly 21 is pivoted to a secondary pivot pin 27 28 on the upstanding outwardly offset flange 23 of the support bracket 16 in a location spaced vertically and horizontally with respect to the first pivot pin 27 on the flange 23 so that when the lap bar 18 and its right angular arm 20 is moved from horizontal position to a substantially vertical position or vice versa, movement is imparted to the piston end of the pneumatic piston and cylinder assembly 21 in an amount sufficient to move the same against fluid pressure in the cylinder and thereby yieldingly holding the lap bar in desired position, either on the rider's lap on in elevated out of the way position.

This occurs due to the horizontally and vertically offset locations of the first pivot pin 27 in the arm 20 and the secondary pivot 28 in flange 23 which engage the pneumatic piston and cylinder assembly 21.

In FIG. 2 of the drawings, broken center lines A and B illustrate the vertical spacing of the pivots 27 and 28 and in FIG. 3 of the drawings vertically spaced center lines A and B also appear as do horizontally spaced center lines C and D, respectively.

By referring now to FIG. 4 of the drawings, it will be seen that each of the right angular arms 20 of the lap bar 18 are provided at their ends with apertured fittings 30 which are engaged on the pivot pins 27 which extend inwardly through the upstanding outwardly offset flanges 23 of the support brackets 16 and 17, respectively.

Still referring to FIG. 4 of the drawings, it will be seen that a pair of outwardly extending stop members 31 are secured to the right angular arms 20 in outwardly spaced relation to the apertured fittings 30 so that when the lap bar 18 is in lowered horizontal position, they will engage portions of or fittings on the sides of the body 10 of the bumper car and thereby prevent the lap bar 18 from moving downwardly beyond desired position where the lap bar 18 rests upon the lap of the rider.

It will thus be seen that an improved lap bar for bumper cars has been disclosed which may be easily and quickly installed in such cars and that it utilizes a simple and practical restraining device for automatically and efficiently yieldingly holding the lap bar in a desired position on the lap of the rider in the bumper car as well as in an elevated position where it is out of the way of the rider entering or leaving the car.

It will also be seen that the formation of the lap bar with the longitudinally extending cushioned plate 24 and its smooth surfaced cross sectionally circular foamed resin cushion provides a very conveniently located cushion support for the arms of the rider, including a passenger, when the lap bar is in lowered horizontal position resting on the lap or laps of the riders.

The present invention requires no more than grasping of the lap bar and the application of a slight downward pull to accomplish the smooth and noiseless movement of the bar down to its restrained operative position and mere upward motion imparted the lap is sufficient to overcome the restraining action and permit its restoration to elevated substantially vertical position, both of which positions may be visually observed by the operator of the ride in which the bumper cars are involved.

Although but one embodiment of the present invention has been illustrated and described, it will be apparent to those skilled in the art that various changes and modifications may be made therein without departing from the spirit of the invention or from the scope of he appended claims and having thus described my invention, what I claim is:

1. A lap bar for bumper cars of the type used in amusement rides wherein said lap bar comprises a widened U-shape member having a transverse section with right angular arms forming its ends, a pair of oppositely disposed support brackets on said bumper car, pivot pins in said support brackets and fittings in the ends of said right angular arms engaging said pivot pins whereby said lap bar is movable from a lowered first position to a elevated second position, a restraining device positioned between and attached to one of said right angular arms and to one of said support brackets for restraining movement of said lap bar, said restraining device comprising a pneumatic piston and cylinder containing a gas having an internal gas pressure, a secondary pivot pin on said one of said support brackets engaging one end of said pneumatic piston and cylinder, said secondary pivot and the pivot pin engaging the end of one of said right angular arms of said lap bar on said one of said support brackets being spaced vertically and horizontally with respect to one another whereby movement of said lap bar from said lowered first position to said elevated second position imparts movement to said piston of said piston and cylinder so as to increase the internal gas pressure to impart a yieldable restraint to said movement of said lap bar.

2. The lap bar of claim 1 wherein upstanding flanges define the upper ends of said oppositely disposed support brackets and said pivot pins and secondary pivot pins are positioned in said upstanding flanges.

3. The lap bar of claim 1 wherein said piston of said pneumatic piston and cylinder is engaged on said secondary pivot.

4. In the combination of a bumper car and a lap bar for restraining riders in said car, said lap bar comprising a widened U-shape having a transverse section and a pair of right angular arms, fittings on said arms, a pair of support brackets on said car, outwardly offset upper ends on said support brackets defining upstanding flanges, pivot pins in said upstanding flanges engaging said fittings on said arms so as to enable said lap bar to be moved from a lower position engaging riders in said car to an upright position spaced forward of said riders in said car; the improvement comprising secondary pivot pins on said upstanding flange and on one of said right angular arms, a restraining device engaging said secondary pivot pins on said upstanding flange and on one of said right angular arms, said restraining device comprising a piston and cylinder containing gas having an internal gas pressure resisting movement of said piston relative to said cylinder to restrain movement of said lap bar relative to said support bracket, said secondary pivot pins on said upstanding flange being offset horizontally and vertically whereby movement of said lap bar imparts movement to said piston of said piston and cylinder so as to increase the internal gas pressure whereby movement of said lap bar is restrained.

* * * * *